(12) United States Patent
Whaley et al.

(10) Patent No.: US 11,341,190 B2
(45) Date of Patent: May 24, 2022

(54) NAME MATCHING USING ENHANCED NAME KEYS

(71) Applicant: INTERNATIONAL BUSINESS MACHINES CORPORATION, Armonk, NY (US)

(72) Inventors: Frank Everett Whaley, Roanoke, VA (US); Charles Kinston Williams, Oak Hill, VA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 384 days.

(21) Appl. No.: 16/734,865

(22) Filed: Jan. 6, 2020

(65) Prior Publication Data

US 2021/0209172 A1 Jul. 8, 2021

(51) Int. Cl.
*G06F 16/00* (2019.01)
*G06F 16/903* (2019.01)
*G06F 40/205* (2020.01)
*G06F 40/295* (2020.01)

(52) U.S. Cl.
CPC ...... *G06F 16/90344* (2019.01); *G06F 40/205* (2020.01); *G06F 40/295* (2020.01)

(58) Field of Classification Search
CPC . G06F 40/205; G06F 40/295; G06F 16/90344
See application file for complete search history.

(56) References Cited

U.S. PATENT DOCUMENTS

| | | | |
|---|---|---|---|
| 7,305,385 B1* | 12/2007 | Dzikiewicz | G06F 7/02 707/999.005 |
| 7,991,805 B2 | 8/2011 | Vincent | |
| 8,706,723 B2 | 4/2014 | Huenemann | |
| 8,855,998 B2* | 10/2014 | Gillam | G06F 16/90344 704/4 |
| 9,015,132 B2 | 4/2015 | Biesenbach | |

(Continued)

FOREIGN PATENT DOCUMENTS

EP 1965321 A1 2/2008

OTHER PUBLICATIONS

Bilenko, M., et al., "Adaptive Name Matching in Information Integration", IEEE, Sep./Oct. 2003, pp. 2-9.

(Continued)

*Primary Examiner* — Leslie Wong
(74) *Attorney, Agent, or Firm* — William Hartwell; Matthew M. Hulihan; Heslin Rothenberg Farley & Mesiti PC

(57) ABSTRACT

Name matching using enhanced name keys is provided by receiving and parsing a queried name into name phrase(s), building a name key for the queried name, the name key for identifying matches between the queried name and candidate names in a database, and the name key including name phrase digraph bitmap signature(s) for the queried name, variant code(s) for the queried name, and pseudo-phonetic name phrase digraph bitmap signature(s) for the queried name, and performing a name matching comparison that includes comparing the queried name to each candidate name of the candidate names in the database, in which the built name key for the queried name is compared to a name key for the candidate name.

20 Claims, 10 Drawing Sheets

(56) References Cited

U.S. PATENT DOCUMENTS

| | | |
|---|---|---|
| 9,020,911 B2 | 4/2015 | Biesenbach |
| 9,275,339 B2 | 3/2016 | Culbertson et al. |
| 2005/0273468 A1 | 12/2005 | Hermansen et al. |
| 2008/0275856 A1 | 11/2008 | Vincent |
| 2010/0153396 A1 | 6/2010 | Margulies et al. |
| 2012/0330947 A1 | 12/2012 | Huenemann et al. |
| 2013/0297634 A1* | 11/2013 | Shami ............... G06F 40/295 707/758 |
| 2021/0149901 A1* | 5/2021 | Fonseca de Lima ..................... G06F 40/169 |

OTHER PUBLICATIONS

Mell, Peter, et al., "The NIST Definition of Cloud Computing", NIST Special Publication 800-145, Sep. 2011, Gaithersburg, MD, 7 pgs.

"Soundex", Wikipedia, page last edited on Sep. 19, 2019, 10:42 (UTC), (retrieved on Sep. 19, 2019 from the Internet URL: <https://en.wikipedia.org/wiki/Soundex>, 1 pg.

* cited by examiner

NAME MATCHING USING ENHANCED NAME KEYS

BACKGROUND

The most accurate results from a name matching system are achieved by comparing query name (or "queried name") against every entry in the set of names being searched. The set of names are candidates to which the queried name is to be compared to identify potential matches. As this can be a very time-consuming process, various techniques are used to reduce the number of potential comparisons to a smaller set of names that are considered most likely to match the queried name. The most common technique is to create a name "key" value that reduces a name to a condensed form. Then, only names with the same key value as the queried name are examined further as potential matches.

SUMMARY

Shortcomings of the prior art are overcome and additional advantages are provided through the provision of a computer-implemented method. The method receives a queried name and parses the queried name into one or more name phrases. The method builds a name key for the queried name. The name key is for identifying matches between the queried name and candidate names in a database. The building the name key includes calculating one or more name phrase digraph bitmap signatures for the queried name. The one or more name phrase digraph bitmap signatures include a name phrase digraph bitmap signature calculated for each name phrase of the one or more name phrases. The building the name key further includes calculating at least one variant code for the queried name. The at least one variant code includes a variant code calculated for each name phrase of a first group of at least one name phrase of the one or more name phrase of the queried name. The building the name key further includes regularizing each name phrase of a second group of at least one name phrase of the one or more name phrases into a respective pseudo-phonetic version of the name phrase. The building further includes calculating at least one pseudo-phonetic name phrase digraph bitmap signature for the queried name. The at least one pseudo-phonetic name phrase digraph bitmap signature includes a pseudo-phonetic name phrase digraph bitmap signature calculated for each regularized name phrase, of the second group of at least one name phrase, based on the pseudo-phonetic version of the name phrase. The built name key includes the one or more name phrase digraph bitmap signatures, the at least one variant code, and the at least one pseudo-phonetic name phrase digraph bitmap signature. The method further includes performing a name matching comparison between the queried name and the candidate names in the database. The name matching comparison includes comparing the queried name to each candidate name of the candidate names in the database, in which the built name key for the queried name is compared to a name key for the candidate name.

Further, a computer system is provided that includes a memory and a processor in communication with the memory, wherein the computer system is configured to perform a method. The method receives a queried name and parses the queried name into one or more name phrases. The method builds a name key for the queried name. The name key is for identifying matches between the queried name and candidate names in a database. The building the name key includes calculating one or more name phrase digraph bitmap signatures for the queried name. The one or more name phrase digraph bitmap signatures include a name phrase digraph bitmap signature calculated for each name phrase of the one or more name phrases. The building the name key further includes calculating at least one variant code for the queried name. The at least one variant code includes a variant code calculated for each name phrase of a first group of at least one name phrase of the one or more name phrase of the queried name. The building the name key further includes regularizing each name phrase of a second group of at least one name phrase of the one or more name phrases into a respective pseudo-phonetic version of the name phrase. The building further includes calculating at least one pseudo-phonetic name phrase digraph bitmap signature for the queried name. The at least one pseudo-phonetic name phrase digraph bitmap signature includes a pseudo-phonetic name phrase digraph bitmap signature calculated for each regularized name phrase, of the second group of at least one name phrase, based on the pseudo-phonetic version of the name phrase. The built name key includes the one or more name phrase digraph bitmap signatures, the at least one variant code, and the at least one pseudo-phonetic name phrase digraph bitmap signature. The method further includes performing a name matching comparison between the queried name and the candidate names in the database. The name matching comparison includes comparing the queried name to each candidate name of the candidate names in the database, in which the built name key for the queried name is compared to a name key for the candidate name.

Yet further, a computer program product including a computer readable storage medium readable by a processing circuit and storing instructions for execution by the processing circuit is provided for performing a method. The method receives a queried name and parses the queried name into one or more name phrases. The method builds a name key for the queried name. The name key is for identifying matches between the queried name and candidate names in a database. The building the name key includes calculating one or more name phrase digraph bitmap signatures for the queried name. The one or more name phrase digraph bitmap signatures include a name phrase digraph bitmap signature calculated for each name phrase of the one or more name phrases. The building the name key further includes calculating at least one variant code for the queried name. The at least one variant code includes a variant code calculated for each name phrase of a first group of at least one name phrase of the one or more name phrase of the queried name. The building the name key further includes regularizing each name phrase of a second group of at least one name phrase of the one or more name phrases into a respective pseudo-phonetic version of the name phrase. The building further includes calculating at least one pseudo-phonetic name phrase digraph bitmap signature for the queried name. The at least one pseudo-phonetic name phrase digraph bitmap signature includes a pseudo-phonetic name phrase digraph bitmap signature calculated for each regularized name phrase, of the second group of at least one name phrase, based on the pseudo-phonetic version of the name phrase. The built name key includes the one or more name phrase digraph bitmap signatures, the at least one variant code, and the at least one pseudo-phonetic name phrase digraph bitmap signature. The method further includes performing a name matching comparison between the queried name and the candidate names in the database. The name matching comparison includes comparing the queried name to each candidate name of the candidate names in the database, in which the built name key for the queried name is compared to a name key for the candidate name.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
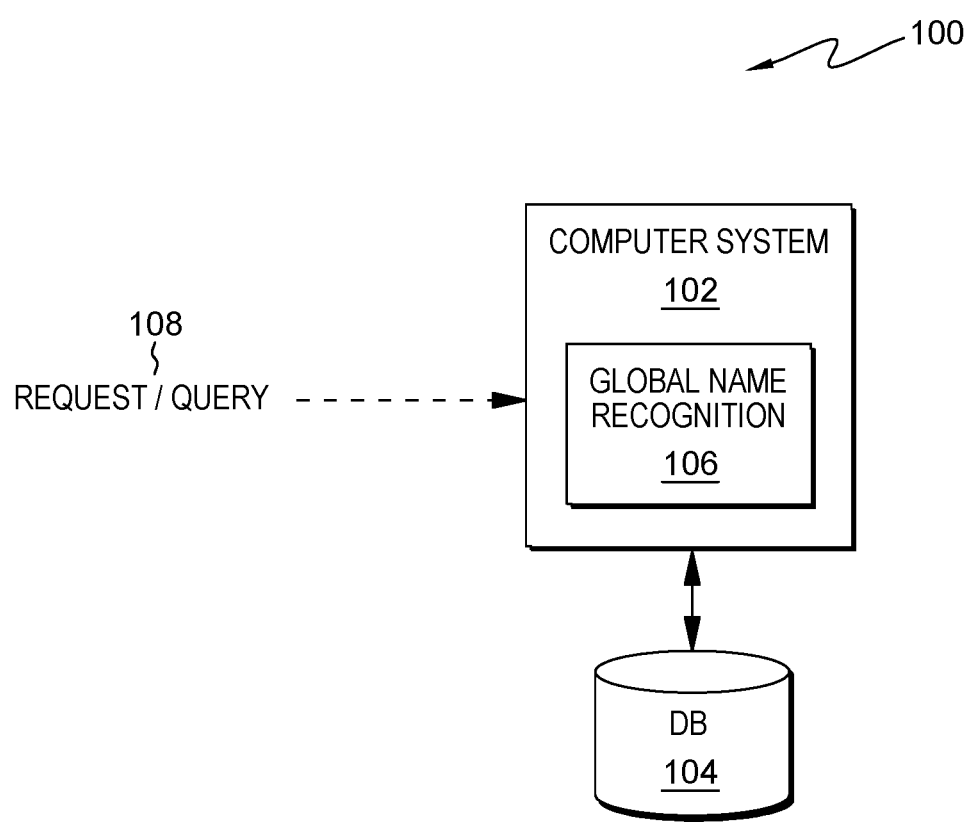
FIG. 1 depicts an example environment to incorporate and use aspects described herein.

Described herein are approaches for name matching using enhanced name keys. Key-based matching systems typically require two name keys to be identical for the names to constitute a match. Name keys are usually created by eliminating information to simplify names, such as dropping internal vowels or collapsing doubled consonants. In some approaches, generating a key value for a name is done, in part, by eliminating information from the name. As such, there is a risk in producing both false positives (spurious matches) and false negatives (missed matches) due to the loss of information. In addition, characters that represent similar sounds may be treated as identical even though these characters may represent different sounds in different cultures. This process can lead to similar names receiving different key values and dissimilar names receiving identical key values. For example, with Soundex encoding, the similar names Simson and Simpson are represented by the key values S525 and S512 respectively, while the unrelated names Robert and Rupert both receive the key value R163. The phrases "key" "key value", "name key value" and "name key" are used interchangeably herein.

Additionally, common key-based matching systems make no allowance for name 'variants', such as nicknames, alternate spellings, or common typographical errors. One approach might work around this by identifying possible variants and creating multiple corresponding key values. Since each distinctive key represents an additional comparison for all entries in a list of candidate names, it is desired that the number of keys created from variants be limited to a small number, such as three to five, thus presenting limitations. The following is a sample algorithm used by an entity resolution system to identify names that might match a queried name:

START
>Receive a queried name [SHERRYL]
>Generate the top X variants: [SHERRYL], [SHERRI], [CHARYL], [SCHERYL]
>Convert generated variants to keys: 5640, 5600, C640, 5264 (each of these is a key)
>Compare the above four query keys to keys generated for the names in the list of candidate names
>If exact match found, add name to bucket for further downstream comparison of other data points (e.g., address, passport number, phone number, etc.), otherwise ignore name for any further processing.
END The above approach has multiple weaknesses. The generation of possible variants does not address all forms of typographical errors. Multiple variants increases the number of comparisons required. Some common names have dozens of known variants, meaning the number of comparisons could very easily become prohibitively large and impractical. Moreover, the errors caused by elimination of data in generating keys remain, and these can be exacerbated by increasing the number of variant keys.

The following examples illustrate unrelated names that most key-based systems identify as similar names (false positives) but which aspects described herein would not report as similar in embodiments:

Alana Gaird~Allean Garrood
Taesoon Daen~Tosan Odedina

The following examples illustrate related names that most key-based systems do not identify as similar (false negatives) but which aspects described herein would rightfully report as similar, in embodiments:

Caroline de Vrie~Caroline de Vries
Ma Carmen Abascal Gonzalez~Maria Abascal

The following examples illustrate related names with typographical errors that existing key-based systems miss but would be identified as a match by embodiments described herein:

Tony Leadbetter~Tony Leapbetter
Yifang Liu—Yih Farng Liu

Providing an approach to generating name key values with little or no loss of information would improve the accuracy of name matching, reducing both false positives and false negatives. Associating additional information with a key value, such as a compact description of variations of a name, would provide additional value by matching names that are considered similar but which may have a significantly different spelling. Both of these features and others are described herein.

FIG. 1 depicts an example environment to incorporate and use aspects described herein. Environment 100 is a searching environment with a computer system 102 that includes a global name recognition 106 component for performing global name recognition. This includes, for instance, receiving a request/query 108, for instance one submitted by a user, processing the queried name, accessing database 104 that includes candidate names that are candidates for matching with the queried name, and performing a name matching comparison between the queried name and candidate names to determine whether the queried name matches to any of the candidate names, and, if so, which ones. It is understood that in practice, computer system 102, or more specifically the facility providing the name recognition functionality, could be provided as one or more computer systems, for instance server system(s) hosted in a cloud or other computer environment that is in communication with client/user computer systems across one or more networks.

One aspect of building a name key for a queried name in accordance with aspects described herein includes the generation of 'digraph signatures'—compact numeric values produced by examining pairs of letters (digraphs) contained within a name. Digraph signatures do not eliminate information in the generation of key values. The comparison of keys based on digraph signatures does not produce only a yes-or-no answer as to exact matching, but rather provides a numeric score that represents the degree of similarity between two signatures. A threshold for an acceptable match can be applied to this "similarity score", thus allowing for the tuning of desirable matches.

Included as part of a global name recognition (GNR) technology may be an ability to generate pseudo-phonetic spellings of names, which pseudo-phonetics could be based on culture-specific (or other contextually-specific) pronunciations automatically derived from the associated ethnicity (or other property) of a name. Digraph signatures can be created as well from these pseudo-phonetic versions, allowing names to be compared by their similarity in spelling and/or their similarity in pronunciation.

Key values may also include "variant group" index values, where an entire set of possible variants are expressed with a single numeric value, also called a variant code. The variant code may be expressed as a bit string as well. The variant code reduces the evaluation of variants to a single numeric comparison.

In some aspects, each of these techniques—digraph bitmap signature calculation and variant code calculation—is aided by using information about the ethnicity of names available in GNR technology, allowing selection of culture-specific rules and data. Using digraph bitmap signatures based on the name and others on the pseudo-phonetic version, as well as variant codes, can provide fewer false positives and false negatives. Several advantages over traditional key-based systems are achieved. For instance:

1. Extensive name variant data can easily be taken into consideration with minimal performance cost.
2. Names can also be compared based on their similarity of pronunciation rather than their spelling.
3. Predictable differences in spelling based on a name's cultural provenance can be considered.
4. Identification of potential matches can be configured based on a similarity score threshold rather than simple equality.
5. Typographical errors do not prevent related names from matching.

Identification of a candidate name as matching based on name key comparison as described herein, may provide a desired level of accuracy in identifying true matches. However, in some examples, an explicit pair-wise comparison between the queried name and the 'matching' candidates can additionally be performed. Full pair-wise comparison can thus eliminate false positive matches that pass the initial name key-based comparison.

Figure 2:
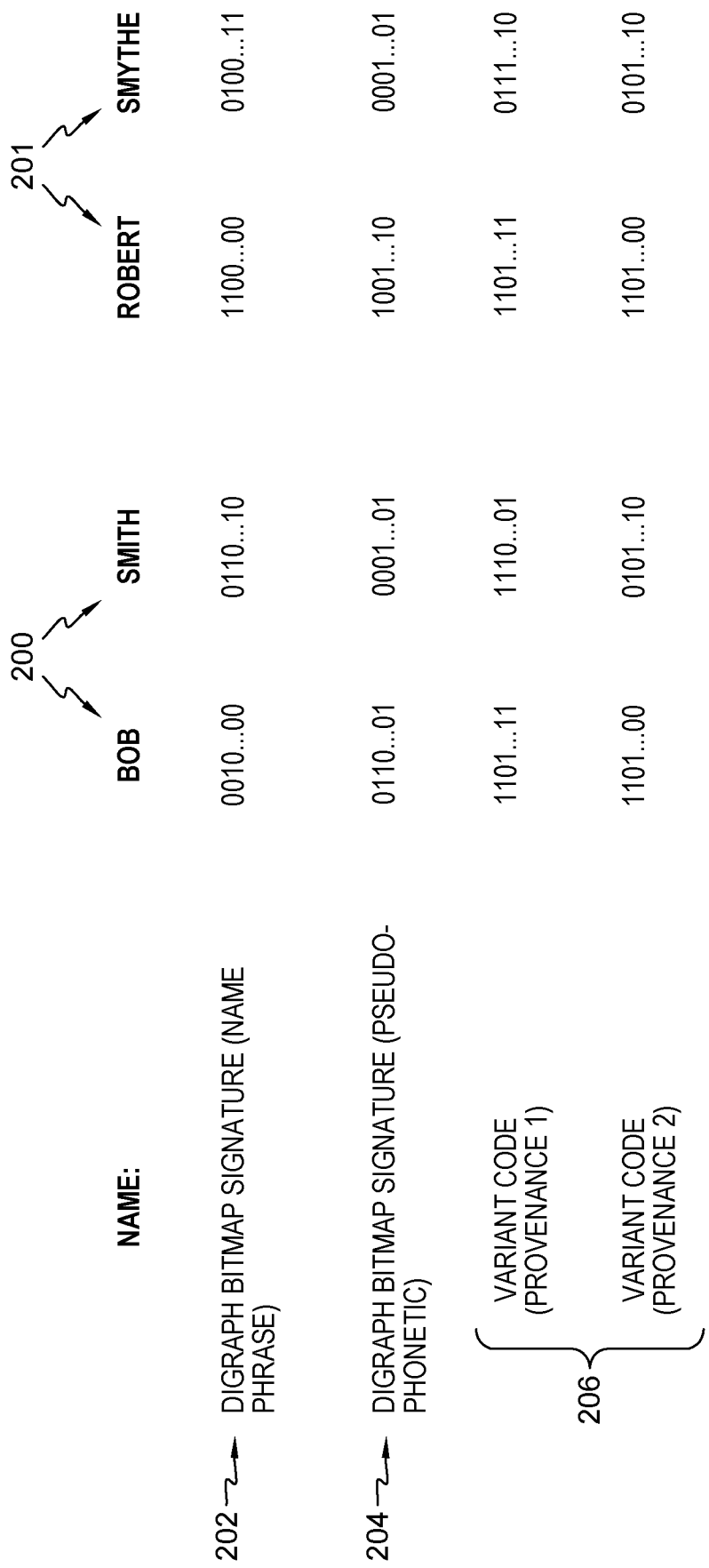
FIG. 2 depicts an example comparison of names based on digraph bitmap signatures and variant codes, in accordance with aspects described herein.

To assist in presenting some aspects described herein, FIG. 2 depicts an example comparison of names based on digraph bitmap signatures and variant codes, in accordance with aspects described herein. FIG. 2 compares the two names Bob Smith and Robert Smythe. The name "Bob Smith" 200 is composed of two name phrases—Bob and Smith—which are a given name and surname, respectively. The name "Robert Smythe" 201 similarly is composed of two name phrases—Robert and Smythe—which are a given name and surname, respectively.

For each name phrase, a respective name phrase digraph bitmap signature 202 is calculated. The bitmap signature is a bit string (e.g. zeros and ones). Although the length can be any desired length, in a particular example it is 64 bits in length. Not all bits are shown in the example of FIG. 2.

Similarly, a respective pseudo-phonetic digraph bitmap signature 204 is calculated for each name phrase. That is, a digraph bitmap signature is calculated for the pseudo-phonetic version of the name phrase. If no pseudo-phonetic version of a name phrase is not available or it is no different from the original name phrase, the calculated pseudo-phonetic digraph bitmap signature 204 could be omitted or could be the same as the name phrase digraph bitmap signature 202. Otherwise, the pseudo-phonetic digraph bitmap signature 204 could be a different digraph bitmap signature as compared to the name phrase digraph bitmap signature 202.

Additionally, variant codes 206 are generated for each name phrase. Here, variant codes for two different cultural provenances are calculated. Cultural provenance refers to the origin/history of the name from a particular cultural perspective. The provenance of a name might be vastly different in one context (e.g. culture) culture than it is in a different context (e.g. culture). The variants of the name may vary accordingly, and therefore the variant codes will vary depending on the particular cultural provenance the subject name.

With respect to the name phrase digraph bitmap signatures 202, the first names Bob and Robert clearly do not have the same letter combinations and therefore have different name phrase digraph bitmap signatures 202, as shown. The same applies to the last names Smith and Smythe.

With respect to the pseudo-phonetic name phrase digraph bitmap signatures 204, the first names Bob and Robert are mismatches but the last names Smith and Smythe are, in this example, considered phonetically similar; their pseudo-phonetic representations, produced via the technique of regularization for example, match and therefore their pseudo-phonetic name phrase digraph bitmap signatures 204 match, as shown. For instance, the pronunciation of the two names Smith and Smythe might be considered phonetically equivalent. Cultural or other contextual provenance can factor also into the regularization process and therefore vary the phonetic version of a name depending on the context.

Assume that provenance 1 in FIG. 2 is culture associated with country A and that, in country A, the names Bob and Robert are typically considered variants of each other. For instance, Bob is a common nickname for the name Robert. Therefore, the variant code 206 for these two names under provenance 1 matches, because both Bob and Robert are considered to fall within the same group of variants. However, the two last names Smith and Smythe may be considered to be significantly different last names in country A, hence not being considered as variants of each other, and consequently having mismatching variant codes 206 under provenance 1.

Assume that provenance 2 is culture associated with country B, where "Smith" is akin to "Smythe" in country B, and therefore the two would be considered variants of each other (hence matching variant codes 206 for provenance 2).

Meanwhile, if Robert and Bob are variants of each other in the context of country B, as here, their variant codes 206 will also match, as shown.

As noted in addition to variant determination, cultural provenance can also factor into pseudo-phonetics of a name, where, under one culture the pseudo-phonetic is different from the pseudo-phonetic under another culture. For this reason, multiple pseudo-phonetic digraph bitmap signatures across more than one contextual provenance might be produced for a given name phrase.

The collection of name phrase digraph bitmap signatures 202, pseudo-phonetic name phrase digraph bitmap signatures 204, and variant codes 206 for each name phrase of a particular name is presented herein as an enhanced name key for the name. Other information could also be included in the name key.

The process of searching for/recognizing matching names utilizing name keys as described herein may be divided into two stages: generation of key values, and comparison of name keys, i.e. comparison of the name key for a queried name to name key(s) for candidate name(s) in the database.

Thus, in one stage, a name key is generated for a name. Name key generation can take advantage of linguistic analysis technology provided by a global name recognition facility. For example, the facility can perform transliteration (conversion to a specific set of characters, for instance Latin characters), categorization (determining whether names are associated with persons or organizations), parsing of names (identifying name phrases and separating into, e.g., surname and given name values), culture classification (identifying ethnic characteristics of names), variant identification (lookup of variant codes), and/or regularization (creation of pseudo-phonetic versions of names). The name keys can be created based on this analytic data being available. The name key building can be performed for any candidate name of the database, as well as any received queried name, to enable comparison therebetween as described herein based on name keys.

Digraph signatures are generated by enabling bits in a bitmap (for instance a 64-bit bitmap) to which character digraphs have been assigned. These digraph signatures are interchangeably referred to as "digraph bitmap signatures". An example digraph bitmap signature creation process is described briefly as follows, for convenience. Names are first padded so the initial and final letter frequencies can be taken into consideration. The digraphs in the name JANE are therefore: _J, JA, AN, NE, and E_, with the '_' element representing the pad. Each of these digraphs enables the bit position in a 64-bit bitmap to which possible digraph combinations have been assigned. Given a 26-character alphabet and padding names as described, there are 728 possible character digraph combinations (i.e., 26*26+26+26). Digraphs are assigned to bitmap positions based on the frequency of their occurrence in a large list of multicultural names. Using frequency to distribute the digraphs, rather than employing a simple round-robin distribution, produces fewer overloaded bitmap positions. In this regard, this optimization can reduce bitmap collisions for common digraphs. Assigning digraphs to bit positions based on frequency minimizes overlaps of more common digraphs. Two common digraphs occurring in the same name are therefore less likely to occupy the same bit position, which would have the undesired effect of enabling a single bit position rather than two. If the number of matching bits in two signatures meets or exceeds a configurable threshold, the associated names are considered to be a match.

By way of a specific example using a queried name that consists of the single name phrase GONZALEZ, a comparison of GONZALEZ to each of GONZALES and MARTINEZ would produce the results exemplified by the following, where each 0 and 1 corresponds to a single bit of the bit positions in the bitmap (not all 64-bits are shown in this example):

| | |
|---|---|
| GONZALEZ --> | 0 0 0 1 0 0 1 1 0 0 1 0 1 . . . 0 0 |
| GONZALES --> | 0 0 0 1 0 0 1 1 0 0 1 0 0 . . . 0 0 |
| Matching bits: | 0 0 0 1 0 0 1 1 0 0 1 0 0 . . . 0 0 |

Assuming the number of Matching bits above meets/exceeds a specified threshold, GONZALEZ and GONZALES are deemed a match.

| | |
|---|---|
| GONZALEZ --> | 0 0 0 1 0 0 1 1 0 0 1 0 1 . . . 0 0 |
| MARTINEZ --> | 0 0 0 0 0 0 0 0 0 1 0 1 . . . 0 0 |
| Matching bits: | 0 0 0 0 0 0 0 0 0 1 0 1 . . . 0 0 |

Assuming the number of Matching bits above does not meet/exceed the threshold, GONZALEZ and MARTINEZ are deemed not to be a match.

Through the use of the specified threshold, which could be predetermined/prespecified, a potential match does not require identical digraph signatures; it requires only enough commonality between the enabled bits in each digraph signature to meet or exceed a specified percentage or other numerical threshold. In accordance with aspects described herein, name key values built from digraph signatures include respective signature value(s) for each "name phrase" within a name, where a name phrase includes one or more name tokens that comprise an individual element of a name. The name phrases are identified by parsing the name. A name phrase could be composed of a single component ("Robert") or more than one component ("Anne-Marie", "de Salvio", and "abd'ul Jabbar", as examples). Parsing into the phrases allows individual elements (phrases) of names to be matched, so "Lyndon" would be a partial match to the name "Lyndon Baines", as it would match to the "Lyndon" name phrase of the name "Lyndon Baines". One or more digraph signatures are generated for each name phrase of a name. Thus, (at least) two name phrase digraph signatures would be calculated for the name "Philip de la Cruz", as it has two name phrases—"Philip" and "de la Cruz".

The enhanced name keys described herein also include variant codes. The name phrase digraph signatures for name phrases can be combined with variant group indices/codes for known variations of a name phrase. By way of example using the name phrase "Robert", this might be associated with a group index (for instance a 32-bit integer value) representing the known variants that follow:

ROBERT:ROBERG:ROHERT:ROB:ROBT:ROBERRT: ROBGERT:ROBBIE:B OBBY:BOB:ROBURT: ROBORT:ROBERET:RBERT:ROBBY:RBOERT: ROV ERT:ROBSRT:ROBERY:ROBBERT:ROBRT: RDBERT:ROBERTH:BOBBIE:R OBEERT: ROBART:RIBERT:ROBB

It is noted that the letter case of letters (e.g. upper case vs. lower case) may be disregarded in some embodiments. The name phrases "Robert", "ROBERT", "robert", "RObert", "rOBERt", etc. could all be considered equivalent.

The variant collection above is represented by a variant code. A single name phrase might not have any known variants, and therefore will have no known variant codes.

Alternatively a name phrase might be associated with one or more variant codes, for instance when the name phrase could have different associations based on cultural or other contextual provenance of the name, as explained herein.

A name key for a name with one or more name phrases can therefore include zero or more variant codes, along with digraph bitmap signature(s). The digraph signatures that are generated from the name phrases as they are presented in the name (perhaps after transliteration or a normalization process applied before parsing) are referred to herein as "name phrase digraph bitmap signatures". In accordance with additional aspects, regularization could be applied to name phases to produce pseudo-phonetic version(s) thereof, and digraph signature(s) can be calculated for any such pseudo-phonetic version to produce what are referred to herein as "pseudo-phonetic name phrase digraph bitmap signatures".

The variant codes can be determined for either or both of the original name phrases and the regularized (pseudo-phonetic) versions of the name phrases, if available. In this manner, the name key for a name could include, for each name phrase, a name phrase digraph bitmap signature, a pseudo-phonetic digraph bitmap signature, and one or more variant codes, each corresponding to a respective one of the aforementioned digraph signatures. In addition, as noted, cultural, regional, language-specific, or other contextual provenance could dictate particular variant groups of a given name or name phrase. A presented spelling of a name might be associated with a group of Language A variants when the provenance of the name is associated with Language A, but a different group, of Language B variants, when the provenance of the name is associated with Language B. Similarly, a name presented in one context (regional, cultural, ethnic, dialect, etc.) might have a different group of variants than if the same name is presented in a different context.

In addition, the pseudo-phonetic version of a name could also be affected by the aforementioned contexts. For this reason, there may be different pseudo-phonetic variations of the same name depending on the context. Consequently, the name key for a name could include, for each name phrase, a name phrase digraph bitmap signature, one of more pseudo-phonetic digraph bitmap signatures for different provenances, and one or more corresponding variant codes, potentially also for different provenances.

On top of the above, cultural and other provenance could dictate how a name is parsed. The name JACK DEL REY in one culture, language, etc. could be parsed into three name phrases—"JACK", "DEL", and "REY", e.g. a surname, middle name, and given first name—while in another culture be parsed into two name phrases—"JACK" and "DEL REY". Consequently, for each such different parsing result, the respective digraph bitmap signatures and variant codes can be produced as described herein. How a name is parsed can affect the signatures and codes calculated.

Consideration of the cultural or other provenance can be given when selecting which elements of name keys are to be used in name matching comparisons. The elements in a name key can therefore be associated (labeled, indicated, etc.) with given contexts, or provenances. If a queried name is presented with a given provenance, for instance the name is a traditional Language A name being queried against a Language A name database, then this cultural provenance could be used to select the elements (digraph signatures, variant codes) that were produced pursuant to that cultural provenance, including name parsing, digraph signature calculation, and variant code calculation.

To illustrate these aspects using the name phrase 'ELEMENT1 ELEMENT2':

- 'ELEMENT1 ELEMENT2' alone may be parsed as 'ELEMENT2, ELEMENT1', i.e. split into surname phrase ELEMENT2 followed by given name phrase ELEMENT1;
- 'ELEMENT3 ELEMENT1 ELEMENT2' may be parsed as 'ELEMENT1 ELEMENT2, ELEMENT3', with 'ELEMENT1 ELEMENT2' being recognized as a surname (Father's name) and ELEMENT3 being recognized as the given name); and
- 'ELEMENT1 ELEMENT 2 ELEMENT3' may be being parsed as 'ELEMENT3, ELEMENT1 ELEMENT2', with ELEMENT3 being recognized as the surname and 'ELEMENT1 ELEMENT2' being recognized as a given name).

Cultural and other contextual provenances can control whether the name phrase 'ELEMENT1 ELEMENT2' is split, treated as a surname, or treated as a given name, for instance.

Digraph signatures and variant group indices (variant codes) can be further grouped into surname and given name collections specific to the original names, to provide surname elements of the name key and given name elements of the name key. This can improve the quality of potential matches by ensuring only corresponding parts of names are compared against each other (many names can be either surnames or given names, so accurate matching of a name like "Bradley" can depend on positional information) and can also ensure that matches against both surname and given name values are found (matching "John Brady" to "John Brady Smith" is inaccurate if "Brady" is the surname of one record but part of the given name in another record).

Name key generation can therefore produce and provide a collection of integer values—one or more name phrase digraph bitmap signatures/values, one or more pseudo-phonetic name phrase digraph bitmap signatures/values, and zero or more variant group index values/codes. The name key having these (and possibly other) elements can be stored and/or used in comparisons.

Figure 3:
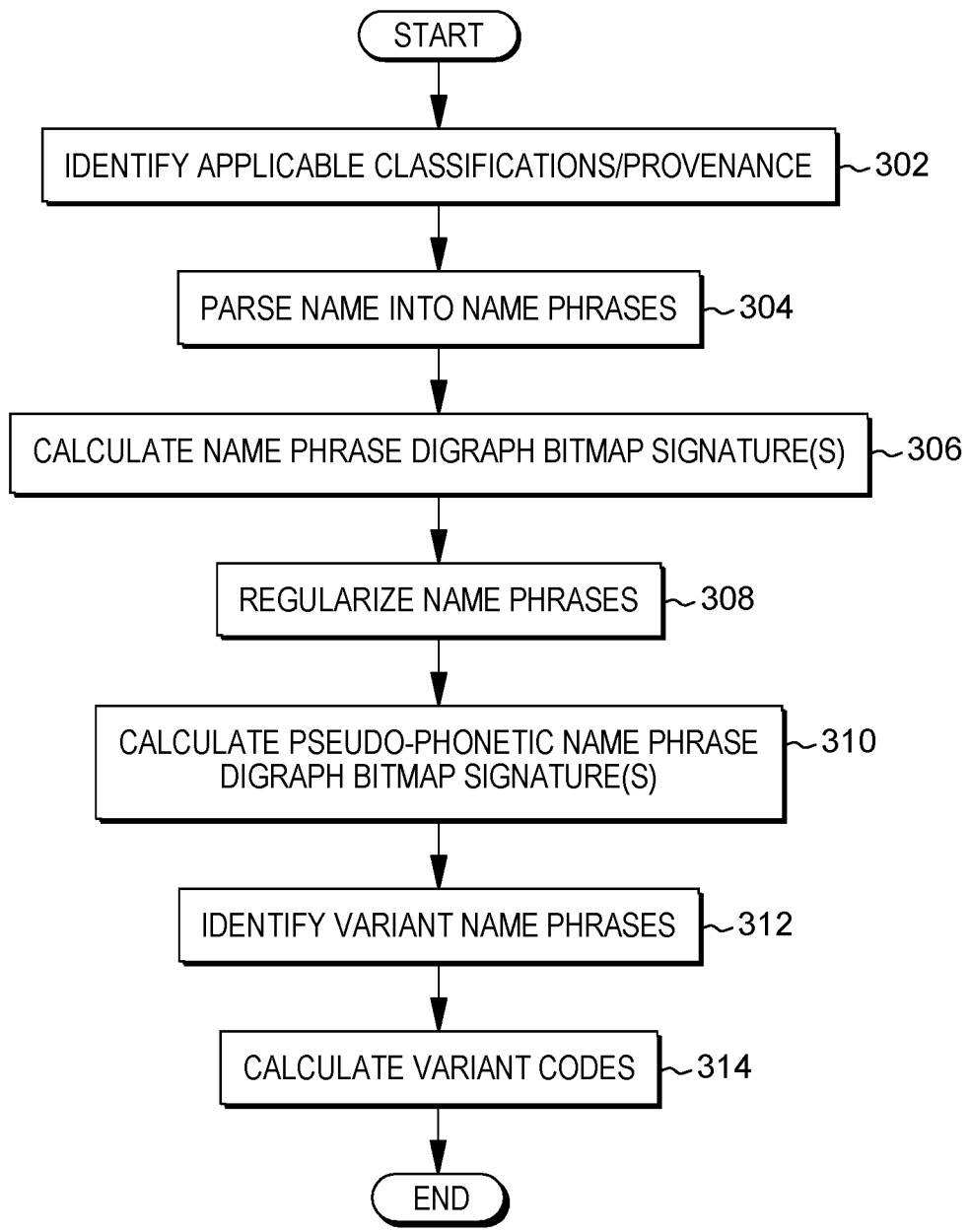
FIG. 3 depicts an example process for generating a name key for a name, in accordance with aspects described herein.

FIG. 3 depicts an example process for generating a name key for a name, in accordance with aspects described herein. The process can be used when both storing candidate names to a database, i.e. to generate and store their name keys with them, and also when a queried name is received, i.e. to generate the key for purposes of comparison to the name keys of the candidate names. In some examples, the process of FIG. 3 is performed by a computer system, such as a system providing global name recognition functionality, and optionally after some pre-processing, for instance performing transliteration.

The process identifies (302) applicable contextual classifications/provenances (which could influence later aspects of the process as described above), parses (304) the name into name phrases, calculates (306) name phrase digraph bitmap signatures for the name phrases, regularizes (308) the name phrases and obtains pseudo-phonetic versions thereof, calculates (310) pseudo-phonetic name phrase digraph bitmap signatures, identifies (312) variant name phrases, and calculates (314) variant codes.

A second phase, comparison of name keys for names, can be performed at any time after the generation of the key values, for instance when a queried name is received as part of a query to determine whether it matches to any candidate names in a database. A specific example of such a query is one seeking to determine whether the query name is included in a list of individuals that have been flagged as being subject to special treatment.

In an example implementation of name matching comparison between two names, comparisons are performed first against surname values/elements and then, if a potential match is found, against given name values/elements. In this implementation, only if potential matches against both surname and given name elements are found is a potential match reported. Within both surname and given name values, the variant group indices can be compared first, as this could be a faster operation and a match against a name variant may be considered to score above any threshold matching value. In the event that no variant index/code match is found, then the digraph bitmap signatures can be compared to see whether the similarity scores for, first, the original, and then (if not the original), the pseudo-phonetic versions, are above the match threshold.

Figure 4:
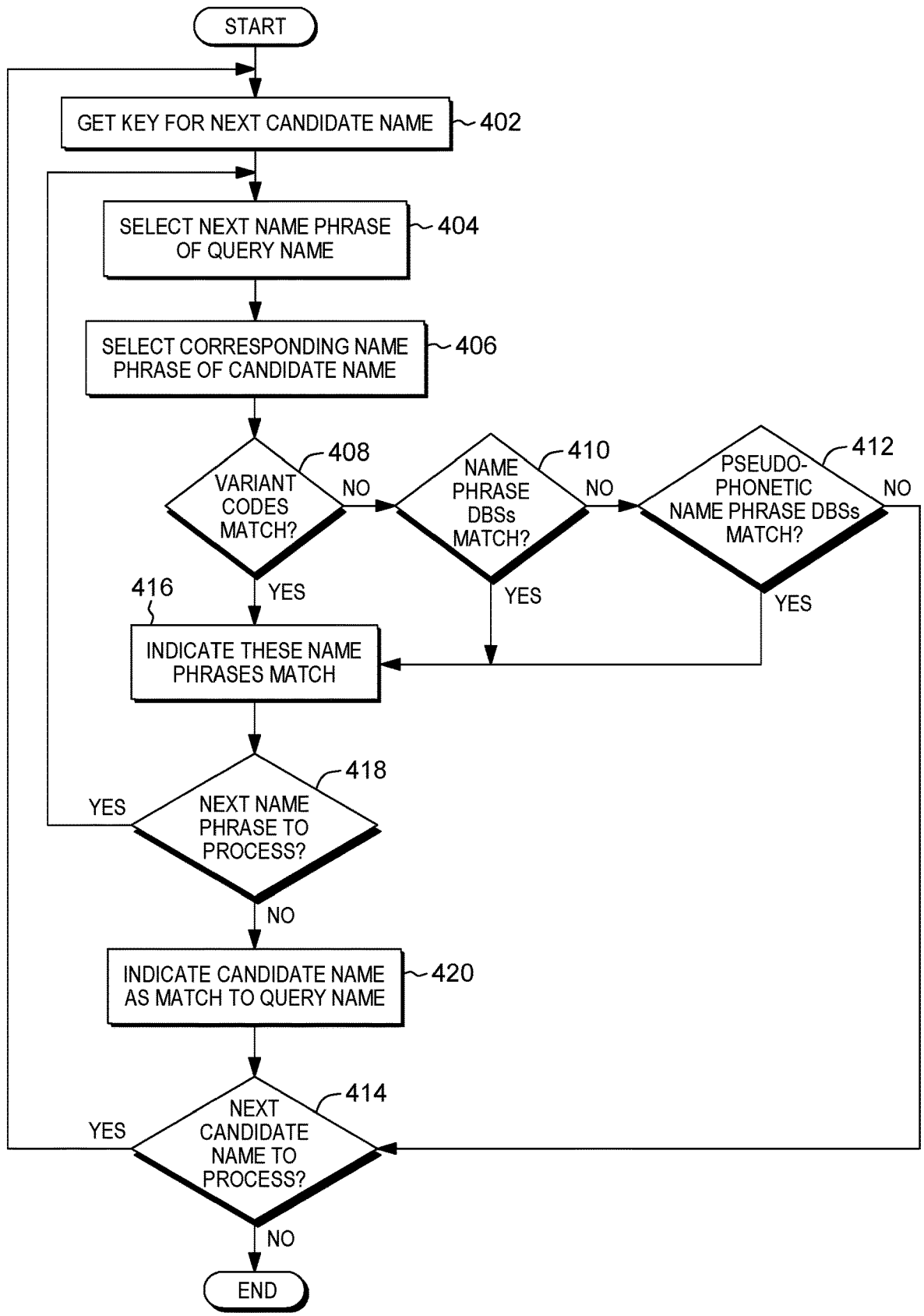
FIG. 4 depicts one example process for comparing a queried name with candidate names to identify matches, in accordance with aspects described herein.

FIG. 4 depicts one example process for comparing a queried name with candidate names to identify matches, in accordance with aspects described herein. In examples, the process is performed by a computer system, such as a computer system providing global name recognition facilities.

The process initially enters an outer loop that is performed for each candidate name in the database that is to be compared with the queried name. The process obtains (402) the name key for that next candidate name to which the queried name is to be compared. The process then enters an inner loop that begins by selecting (404) a next name phrase of the query name for comparison to a corresponding name phrase of the candidate name and obtaining its generated name key. The order in which the name phrases of the queried name are selected for comparison to corresponding name phrases of the candidate name can be tailored as desired. For instance, it may be desired to select a surname name phrase, if present in the query name, for comparison before then comparing the given name phrase(s).

If no corresponding name phrase of the candidate name is available, then at that point the process could determine no match and return to 402 for comparison of the next candidate name.

After selecting the next name phrase (404) and selecting (406) a corresponding name phrase of the candidate name, the process determines (408) whether the variant codes for the two match by looking to the appropriate elements of their name keys. If they do not match (408, N), the process determines (410) whether the name phrase digraph bitmap signatures for the two name phrases match. If not, the process determines (412) whether the pseudo-phonetic name phrase digraph bitmap signatures for the two name phrases match. If inquiry 412 is also answered in the negative (412, N), then the name phrases are considered not to be a match. If corresponding name phrases of the two names do not match, then it follows that the names themselves are considered not to be a match. Accordingly, the process breaks from processing the name phrases of the candidate name (breaks from the inner loop) and proceeds to inquiry 414 where it determines whether there is a next candidate name to process. If so (414, Y), the process returns to 402 to select the name key for the next candidate name to process.

If the variant codes match (408, Y), or if they do not match (408, N) but the name phrase digraph bitmap signatures match (410, Y), or if they too do not match (410, N) but the pseudo-phonetic name phrase digraph bitmap signatures match (412, Y), then the process has found a match between the name phrases being compared. The process determines (416) that these name phrases match. The process then determines (418) whether there is a next name phrase of the query name to process. If so, the process loops back to 404 to select the next name phrase of the query name and commence the next iteration of the inner loop that compares name phrases of the query name against corresponding name phrases of the candidate name.

Otherwise, if at 418 it is determined that there is no next name phrase to process (418, N), then the inner loop processing ends, having not broken (412, N) for any compared name phrase. This means all name phrases of the query name match to corresponding name phrases of the candidate name, and the candidate name is indicated (420) as a match to the query name. The process then proceeds to 414 where it determines whether there is a next candidate name to process.

At 414, the process returns to 402 to select the key for the next candidate name if there is a next candidate name to compare to the query name (414, Y). Otherwise, if there are no more candidate names to process (414, N), the processing of the outer loop ends, as does this process of FIG. 4. At the end of this process, a collection of zero or more candidate names have been indicated as matching the query name. From there, additional processing of the candidate names found to be matching by the process of FIG. 4 could be performed, if desired. For instance, this list of candidate names could be returned as a response to the original query. Additionally or alternatively, a pair-wise comparison between the queried name and the 'matching' candidates could be performed to optionally further prune this list based on a pair-wise comparison matching.

To illustrate an example process flow for key generation and name comparison, assume first that the queried name is "Joe" and a database stores candidate names (and their name keys) against which the queried name is to be compared. A name phrase digraph bitmap signature (A) for "Joe" is calculated, as is a pseudo-phonetic name phrase digraph bitmap signature (B) for the regularized, pseudo-phonetic version, "JO". Assume further that there are no variants. When comparing the queried name to the candidates, a next candidate name is selected and a name phrase digraph bitmap signature for the candidate name is selected from the name key for the candidate and compared to digraph signature A. If there is a match, the process breaks and the candidate name is added to a list of 'hits'. Otherwise, a pseudo-phonetic name phrase digraph bitmap signature for the candidate name is selected from the name key for the candidate and compared to digraph signature B. If there is a match, the candidate name is added to the list of 'hits'. Otherwise, the candidate name is not a hit and the process moves onto the next candidate name in the database.

Working from the example above, assume instead that there is a variant code for the name "Joe", which is a likely scenario. In that case, the name key includes digraph bitmap signatures A and B, and variant code C. The variant code C is compared to a variant code for the selected candidate name (if present). If the variant code is not present, or if they do not match, then the process proceeds as above. If they do match, the process breaks and the candidate name is added to a list of 'hits'.

Further, assume that the queried name of the above example was instead "Joe Smith". Assume this results in two name phrase digraph bitmap signatures (one for each name phrase JOE and SMITH, two more on pseudo-phonetic digraph bitmap signatures based on two or more pseudo-phonetics, and two or more variant codes. At least 6 bit strings are thereby produced as part of the name key. Since the name includes a surname (Smith) and a given name (Joe), a hit is required to match the candidate name on both surname and given name elements. If a candidate name does not possess a name phrase corresponding to one of the queries name phrases (e.g. the candidate does not have a surname, or does not have a given name), or if the candidate possesses additional name phrases that do not correspond to any name phrases of the queried name, then the handling of that situation can vary and be implementation specific; it may be up to an administrator or other user whether the candidate could be considered a potential match.

As noted elsewhere herein, if a potential match is found between two name keys as described, then it may be very likely that the two associated names are close matches. However, a global name recognition team could nevertheless desire to validate this premise by utilizing a pair-wise comparison feature of the global name recognition technology, in order to limit the risk of false positive matches. This may be desired in cases where the name comparison is of particular importance for security or other reasons. In cases where pair-wise comparison is implemented after name key-based comparison as described herein, the name key-based comparison nonetheless can advantageously provide for greatly reducing the number of full pair-wise comparisons required for accurate name matching.

Figure 5A:
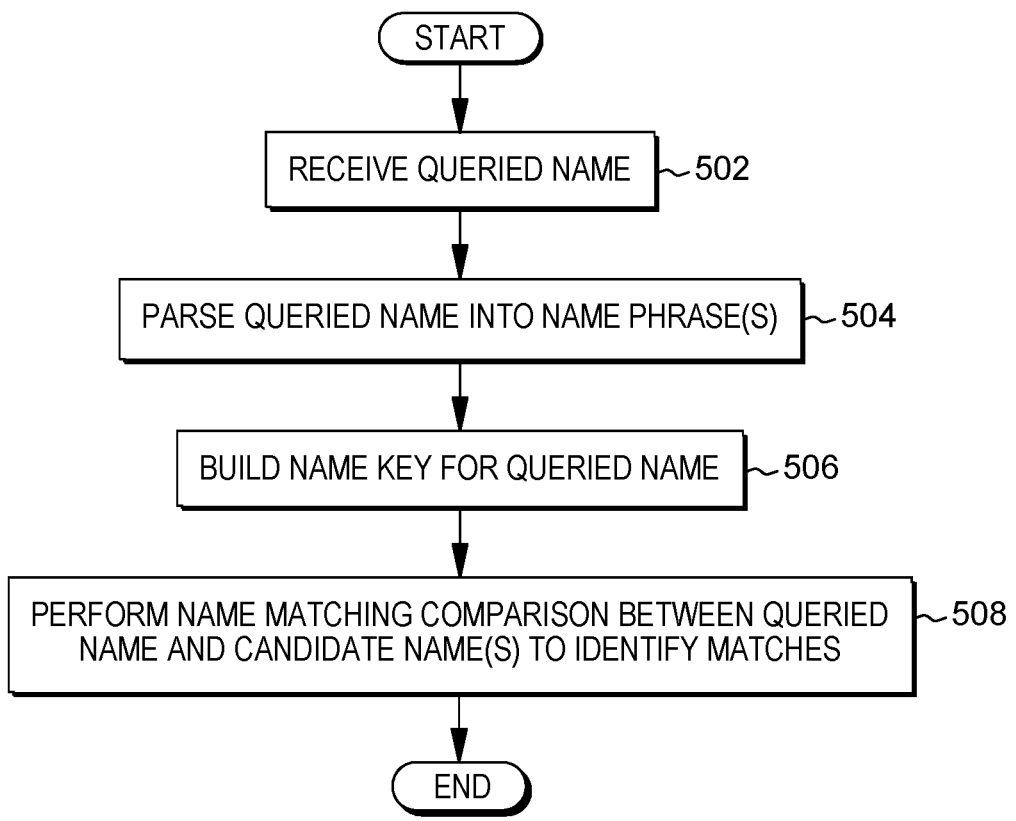
FIG. 5A depicts another example process for comparing a queried name with candidate names to identify matches, in accordance with aspects described herein.

FIG. 5A depicts another example process for comparing a queried name with candidate names to identify matches, in accordance with aspects described herein. In some examples, the process is performed by one or more computer systems, such as those described herein, which may include one or more computer systems providing name recognition facilities and/or one or more other computer systems.

The process begins by receiving (502) a queried name and parsing (504) the queried name into one or more name phrases. The parsing can be based on context for the name, for instance a cultural or other contextual provenance. The parsing can identify name elements, for instance surname, and given name name phrases of the queried name, which can be useful in comparison processing.

The process continues by building (506) a name key for the queried name. The name key facilitates identifying matches between the queried name and candidate names in a database. An example process for building a name key for a name is described in conjunction with FIG. 5B.

Continuing with the process of FIG. 5A, the process performs (508) a name matching comparison between the queried name and the candidate names in the database. An example such name matching comparison is described in conjunction with FIG. 5C. The name matching comparison includes, for instance, comparing the queried name to each candidate name of the candidate names in the database. As part of this, the built name key for the queried name is compared to a name key for the candidate name by way of comparing elements thereof. The name matching comparison provides an indication of whether, and which, candidate names match to the queried name.

Alternatively, a built name key built could be provided with the received queried name (502) in some embodiments, in which case the process could skip 504 and 506.

Figure 5B:
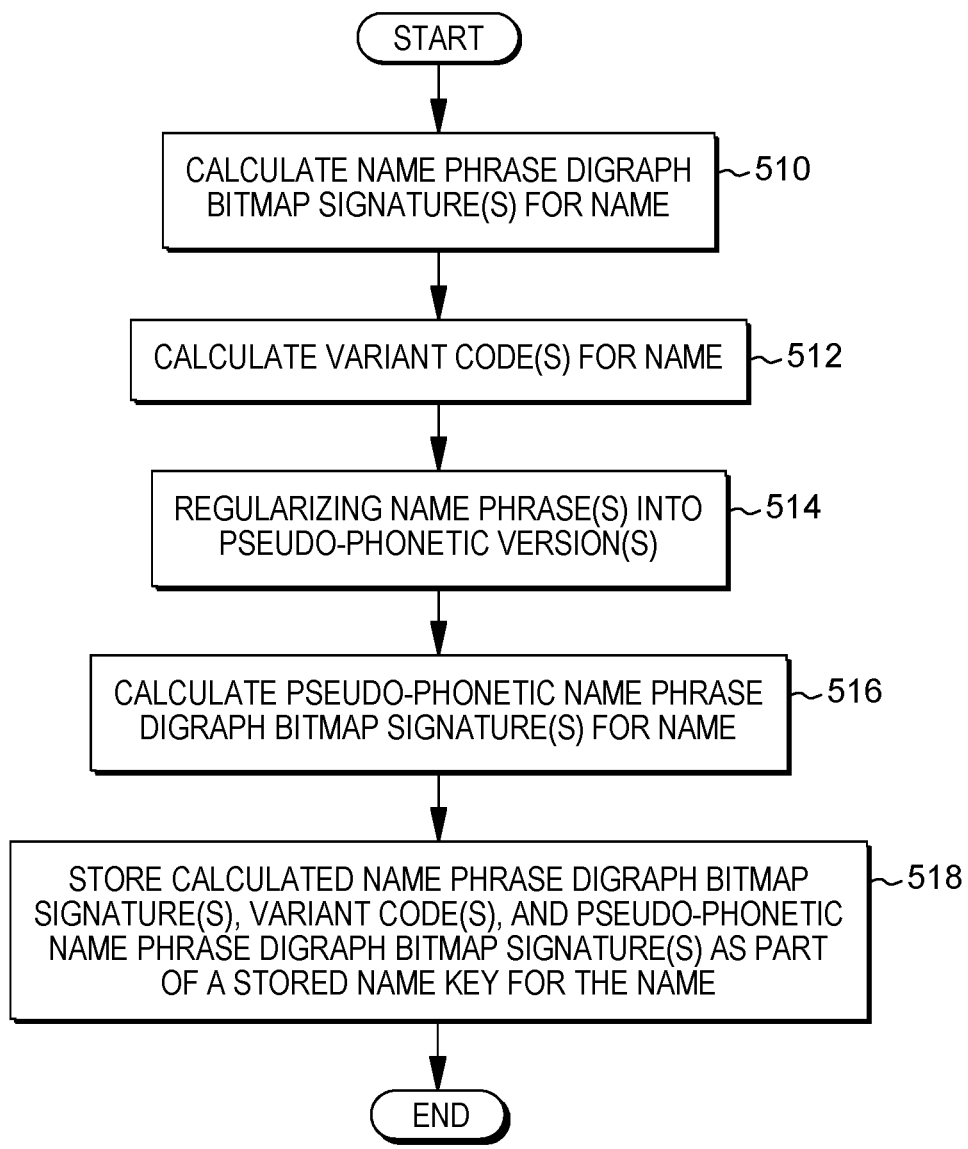
FIG. 5B depicts an example process for building a name key for a name, in accordance with aspects described herein.

FIG. 5B depicts an example process for building a name key for a name, in accordance with aspects described herein. This process can be followed for each candidate name, for instance when the candidate name is imported/stored into the database, or performed for candidate names already stored in an existing database. Additionally, this process can be performed for a queried name in order to generate the name key for the queried name to be used in comparison to the name keys of candidate names in the database. In some examples, the process is performed by one or more computer systems, such as those described herein, which may include one or more computer systems providing name recognition facilities and/or one or more other computer systems.

The process of FIG. 5B calculates (510) one or more name phrase digraph bitmap signatures for the name. The one or more name phrase digraph bitmap signatures include, for instance, a name phrase digraph bitmap signature calculated for each name phrase of the one or more name phrases that were parsed from the name. The process also calculates (512) at least one variant code for the name. The at least one variant code can include a variant code calculated for each name phrase of any zero or more name phrases of the name. That is, there may be no variant codes for any name phrase, or there may be one or more variant codes for each of one of more of the name phrases of the name.

The process also regularizes (514) each name phrase of any zero of more name phrases of the name into a respective pseudo-phonetic version of the name phrase and calculates (516) corresponding calculating pseudo-phonetic name phrase digraph bitmap signature(s) for the name. Here too, there may be no pseudo-phonetics for any name phrase, or there may be one or more pseudo-phonetics for each of one of more of the name phrases of the name. Thus, the pseudo-phonetic name phrase digraph bitmap signature(s) can include a pseudo-phonetic name phrase digraph bitmap signature calculated for each regularized name phrase, based on the pseudo-phonetic version of the name phrase.

The process can then store (518) the variant code(s), name phrase digraph bitmap signature(s), and pseudo-phonetic name phrase digraph bitmap signature(s) as part of a stored name key, so that the name key includes, for instance, at least one name phrase digraph bitmap signatures, at least one variant code, and at least one pseudo-phonetic name phrase digraph bitmap signature.

In some examples, a respective variant code for each of the pseudo-phonetic name phrase digraph bitmap signature(s), in addition to the name phase digraph bitmap signature(s), are generated and included in the name key.

As described above, the type or class of the name phrase, for instance surnames, given names (first, middle, etc.), suffixes, etc. can be identified by the parsing of FIG. 5A. The parsing can therefore identify at least a surname, as one name phrase of the queried name, and a given name, as another name phrase of the queried name. Consequently, the built name key for the queried name can include surname element(s), as those of the name phrase digraph bitmap signature(s), the variant code(s), and the pseudo-phonetic name phrase digraph bitmap signature(s), of the name key, that were calculated for the surname. Similarly, the built name key can include given name elements, as those of the phrase digraph bitmap signature(s), the variant code(s), and the pseudo-phonetic name phrase digraph bitmap signature(s), of the name key, that were calculated for the given name. These different types of elements can be marked as such in the built name key to identify which name key elements correspond to which name phrases of the name.

The use of cultural provenance applying to the whole name itself and/or individual name phrases can influence the parsing of the name into name phrase(s), as well as the calculation of the variant codes and/or the pseudo-phonetic name phrase digraphs bitmap signatures. Calculation of variant code(s) for a name phrase can therefore be dependent on a cultural provenance of the queried name or the name phrase, such that varying cultural provenances would result in calculation of different variant codes for the same/common name phrase. Further, regularization of name phrase(s) can be dependent on the cultural provenance of the queried name or the name phrase, such that varying cultural provenances would result in regularization into different pseudo-phonetic versions for the same/common name phrase, and therefore different resulting pseudo-phonetic name phrase digraph bitmap signatures for the common name phrase.

Figure 5C:
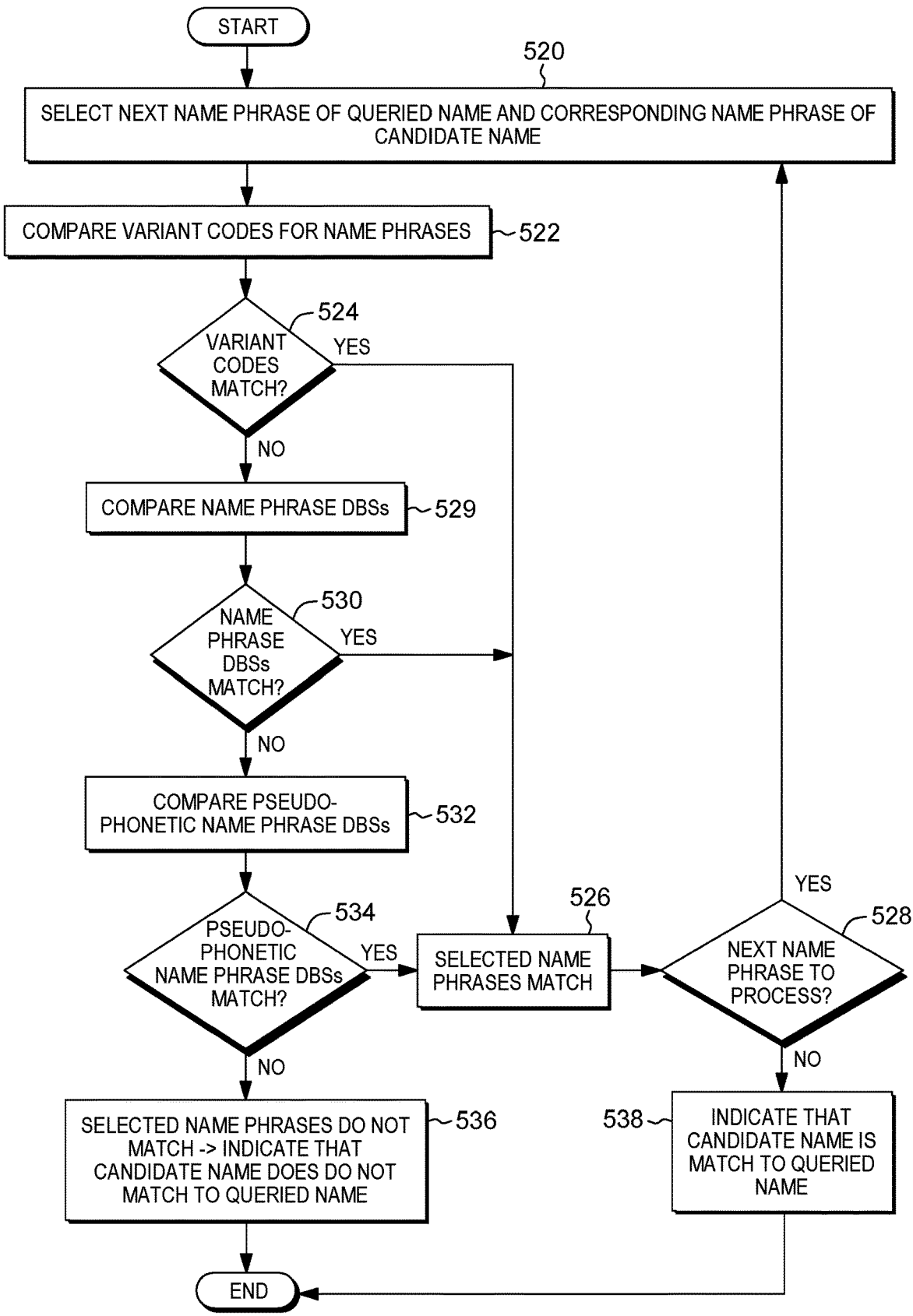
FIG. 5C depicts an example process for performing a name matching comparison between a queried name and a candidate name, in accordance with aspects described herein.

FIG. 5C depicts an example process for performing a name matching comparison between a queried name and a candidate name, in accordance with aspects described herein. In some examples, the process is performed by one or more computer systems, such as those described herein, which may include one or more computer systems providing name recognition facilities and/or one or more other computer systems. The process can be performed for each candidate name to which a queried name is to be compared. This could include some or all of the candidate names in a given database.

Commencement of the process of FIG. 5C enters into a loop, specifically triggering iterative comparison of each name phrase of the queried name to a respective corresponding name phrase of the candidate name that is the subject of the comparison. At each iteration of the iterative comparison, a selected next name phrase of the queried name is compared to its corresponding name phrase of the candidate name to determine whether the name phrase of the queried name matches its corresponding name phrase of the candidate name. A match of each name phrase of the queried name to its corresponding name phrase of the candidate name can indicate that the queried name and the candidate name match. In situations where the queried name or candidate name includes an additional name phrase that does not correspond to a name phrase of the other name, this situation can be handled in any way desired. For instance, it could be taken as a mismatch per se.

The process selects (520) a next name phrase of the queried name and a corresponding name phrase of candidate name. If no corresponding name phrase exists in the candidate name, the process could break (exit) and refrain from indicating a match or explicitly indicate no match. The sequence in which the next name phrase is selected at each iteration of 520 can be tailored as desired. In one example, the name phrase identified as a surname of the queried name, if present, is selected for comparison to a surname of the candidate name before selecting for comparison a name phrase identified as a given name of the queried name.

The example process of FIG. 5C proceeds by first comparing variant codes, then the name phrase digraph bitmap signatures if the variant codes do not match, then the pseudo-phonetic digraph bitmap signatures if the name phrase digraph bitmap signatures do not match. In other examples, these name key elements could be compared in a different sequence or concurrently if desired.

Thus, in this example, the process continues by comparing (522) variant codes calculated for the name phrase of the queried name and its corresponding name phrase of the candidate name. To do this, in an example, it selects a variant code, from the variant code(s) of the built name key for the queried name, calculated for the name phrase of the queried name, selects another variant code, from the name key of the candidate name, calculated for the corresponding name phrase of the candidate name, and compares them. The process determines (525) whether those variant codes match. Based on determining that these compared variant codes do match (525, Y), the process determines that the selected name phrase of the queried name and its corresponding name phrase of the candidate name are a match (526). In that case, the process determines (528) whether there is a next name phrase of the queried name to process. If so, the process returns to 520, proceeding to a next iteration to select and process/compare the next name phrase.

Returning to 524, if instead it is determined that the variant codes do not match (524, N), then based on determining that the compared variant codes do not match, this triggers a name phrase digraph bitmap signature comparison between the name phrase of the queried name and its corresponding name phrase of the candidate name. The process proceeds by comparing (529) the name phrase digraph bitmap signatures calculated for the name phrase of the queried name and its corresponding name phrase of the candidate name. For instance, it selects a name phrase digraph bitmap signature, from the name phrase digraph bitmap signature(s) of the built name key for the queried name, calculated for the name phrase of the queried name, selects another name phrase digraph bitmap signature, from the name key of the candidate name, calculated for the corresponding name phrase of the candidate name, and compares them. The process determines (530) whether those compared name phrase digraph bitmap signatures match. Based on determining that these compared name phrase digraph bitmap signatures do match (530, Y), the process determines that selected name phrase of the queried name and its corresponding name phrase of the candidate name are a match (526). In that case, the process proceeds to 528 as above.

Returning to 530, if instead it is determined that the compared name phrase digraph bitmap signatures do not match (530, N), then based on determining that the compared name phrase digraph bitmap signatures do not match, this triggers a pseudo-phonetic name phrase digraph bitmap signature comparison between the name phrase of the queried name and its corresponding name phrase of the candidate name. The process proceeds by comparing (532) the pseudo-phonetic name phrase digraph bitmap signatures calculated for the name phrase of the queried name and its corresponding name phrase of the candidate name. For instance, it selects a pseudo-phonetic name phrase digraph bitmap signature, from the pseudo-phonetic name phrase digraph bitmap signature(s) of the built name key for the queried name, calculated for the name phrase of the queried name, selects another pseudo-phonetic name phrase digraph bitmap signature, from the name key of the candidate name, calculated for the corresponding name phrase of the candidate name, and compares them. The process determines (534) whether those compared pseudo-phonetic name phrase digraph bitmap signatures match. Based on determining that these compared pseudo-phonetic name phrase digraph bitmap signatures do match (534, Y), the process determines that selected name phrase of the queried name and its corresponding name phrase of the candidate name are a match (526). In that case, the process proceeds to 528 as above.

If instead at 536 it is determined that the pseudo-phonetic name phrase digraph bitmap signatures do not match (536, N), then, on the basis that none of the variant codes, name phrase digraph bitmap signatures, and pseudo-phonetic name phrase digraph bitmap signatures match, that the name phrase of the queried name does not match its corresponding name phrase of the candidate name. At 536, determining that the name phrase of the queried name does not match its corresponding name phrase of the candidate name indicates that the queried name itself does not match the candidate name. Based on determining that the queried name does not match the candidate name, the process breaks from the iterative comparison (i.e. the iterating that would otherwise have looped back to 520 from 528 if each name phrase matches, and the process of FIG. 5C ends. In one example, the process 'ending' actually proceeds to a comparison of the queried name to a next candidate name of the candidate names in the database, if there is a next such candidate name, but again commencing the process of FIG. 5C.

In one scenario, the process of FIG. 5C ends from 526 where a name phrase does not match and therefore the name does not match. Another scenario is, returning to 528, all name phrases of the queried name have been processed and found to match to the candidate name. Having processed all name phrases of the query name and all having matched to the candidate name, the process determined that there is no next name phrase to process (528, N), and process by indicating (538) that the candidate name is a match to the queried name. The process then ends. As above, the process 'ending' could actually proceed to a comparison of the queried name to a next candidate name of the candidate names in the database, if there is a next such candidate name, by again commencing the process of FIG. 5C.

Comparing the queried name to each candidate name of the candidate names in the database can take into account the cultural provenance of the queried name or the name phrase to select the appropriate variant code(s) and/or pseudo-phonetic name phrase digraph bitmap signatures to use in the comparing (522 and 532, respectively) the queried name to each candidate name of the candidate names.

Although various examples are provided, variations are possible without departing from a spirit of the claimed aspects.

Figure 6:
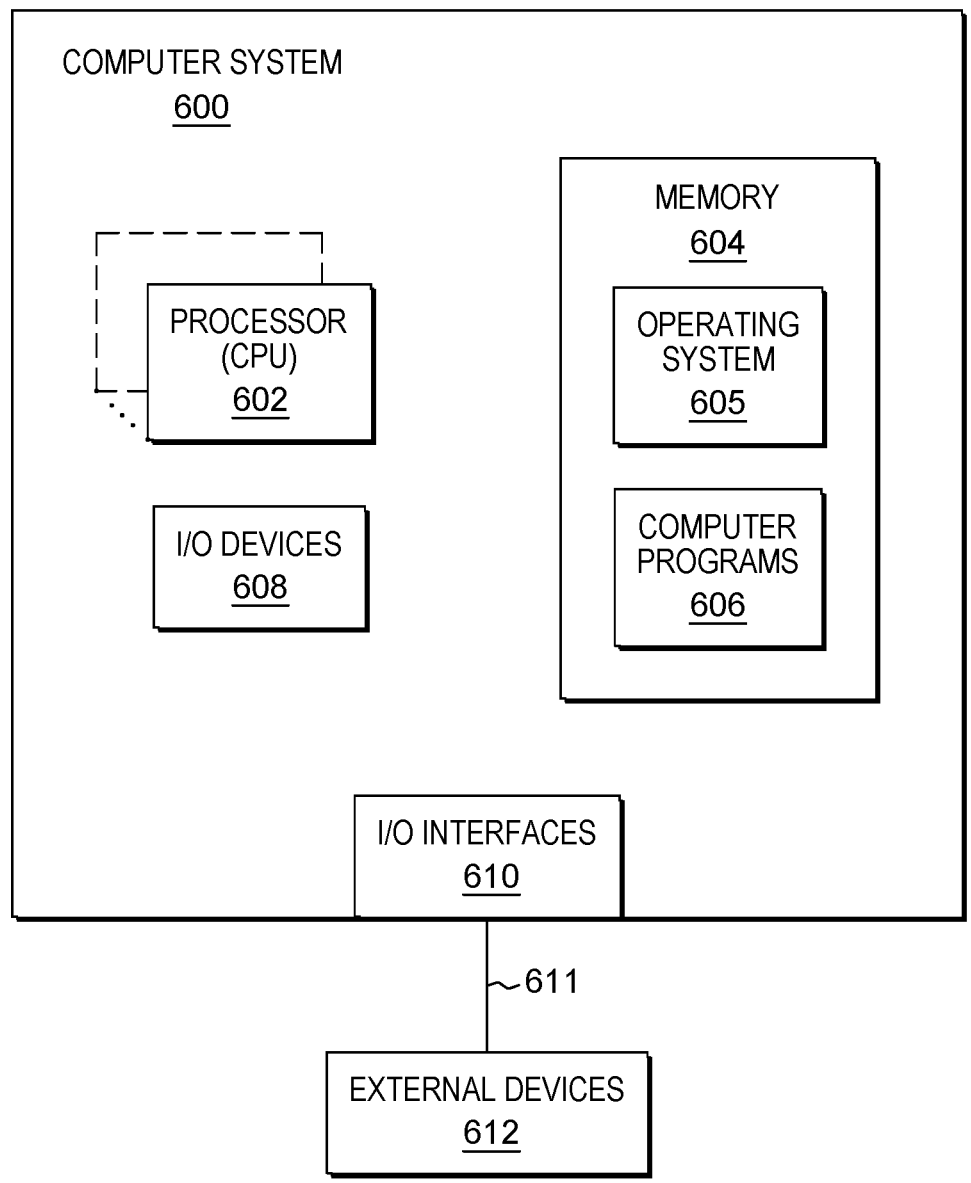
FIG. 6 depicts one example of a computer system and associated devices to incorporate and/or use aspects described herein.

Processes described herein may be performed singly or collectively by one or more computer systems, such as one or more systems providing name recognition/matching functionality, as examples. FIG. 6 depicts one example of such a computer system and associated devices to incorporate and/or use aspects described herein. A computer system may also be referred to herein as a data processing device/system, computing device/system/node, or simply a computer. The computer system may be based on one or more of various system architectures and/or instruction set architectures, such as those offered by International Business Machines Corporation (Armonk, N.Y., USA), Intel Corporation (Santa Clara, Calif., USA) or ARM Holdings plc (Cambridge, England, United Kingdom), as examples.

FIG. 6 shows a computer system 600 in communication with external device(s) 612. Computer system 600 includes one or more processor(s) 602, for instance central processing unit(s) (CPUs). A processor can include functional components used in the execution of instructions, such as functional components to fetch program instructions from locations such as cache or main memory, decode program instructions, and execute program instructions, access memory for instruction execution, and write results of the executed instructions. A processor 602 can also include register(s) to be used by one or more of the functional components. Computer system 600 also includes memory 604, input/output (I/O) devices 608, and I/O interfaces 610, which may be coupled to processor(s) 602 and each other via one or more buses and/or other connections. Bus connections represent one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 604 can be or include main or system memory (e.g. Random Access Memory) used in the execution of program instructions, storage device(s) such as hard drive(s), flash media, or optical media as examples, and/or cache memory, as examples. Memory 604 can include, for instance, a cache, such as a shared cache, which may be coupled to local caches (examples include L1 cache, L2 cache, etc.) of processor(s) 602. Additionally, memory 604 may be or include at least one computer program product having a set (e.g., at least one) of program modules, instructions, code or the like that is/are configured to carry out functions of embodiments described herein when executed by one or more processors.

Memory 604 can store an operating system 605 and other computer programs 606, such as one or more computer programs/applications that execute to perform aspects described herein. Specifically, programs/applications can include computer readable program instructions that may be configured to carry out functions of embodiments of aspects described herein.

Examples of I/O devices 608 include but are not limited to microphones, speakers, Global Positioning System (GPS) devices, cameras, lights, accelerometers, gyroscopes, magnetometers, sensor devices configured to sense light, proximity, heart rate, body and/or ambient temperature, blood pressure, and/or skin resistance, and activity monitors. An I/O device may be incorporated into the computer system as shown, though in some embodiments an I/O device may be regarded as an external device (612) coupled to the computer system through one or more I/O interfaces 610.

Computer system 600 may communicate with one or more external devices 612 via one or more I/O interfaces 610. Example external devices include a keyboard, a pointing device, a display, and/or any other devices that enable a user to interact with computer system 600. Other example external devices include any device that enables computer system 600 to communicate with one or more other computing systems or peripheral devices such as a printer. A network interface/adapter is an example I/O interface that enables computer system 600 to communicate with one or more networks, such as a local area network (LAN), a general wide area network (WAN), and/or a public network (e.g., the Internet), providing communication with other computing devices or systems, storage devices, or the like. Ethernet-based (such as Wi-Fi) interfaces and Bluetooth® adapters are just examples of the currently available types of network adapters used in computer systems (BLUETOOTH is a registered trademark of Bluetooth SIG, Inc., Kirkland, Wash., U.S.A.).

The communication between I/O interfaces 610 and external devices 612 can occur across wired and/or wireless communications link(s) 611, such as Ethernet-based wired or wireless connections. Example wireless connections include cellular, Wi-Fi, Bluetooth®, proximity-based, near-field, or other types of wireless connections. More generally, communications link(s) 611 may be any appropriate wireless and/or wired communication link(s) for communicating data.

Particular external device(s) 612 may include one or more data storage devices, which may store one or more programs, one or more computer readable program instructions, and/or data, etc. Computer system 600 may include and/or be coupled to and in communication with (e.g. as an external device of the computer system) removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media.

Computer system 600 may be operational with numerous other general purpose or special purpose computing system environments or configurations. Computer system 600 may take any of various forms, well-known examples of which include, but are not limited to, personal computer (PC) system(s), server computer system(s), such as messaging server(s), thin client(s), thick client(s), workstation(s), laptop(s), handheld device(s), mobile device(s)/computer(s) such as smartphone(s), tablet(s), and wearable device(s), multiprocessor system(s), microprocessor-based system(s), telephony device(s), network appliance(s) (such as edge appliance(s)), virtualization device(s), storage controller(s), set top box(es), programmable consumer electronic(s), network PC(s), minicomputer system(s), mainframe computer system(s), and distributed cloud computing environment(s) that include any of the above systems or devices, and the like.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
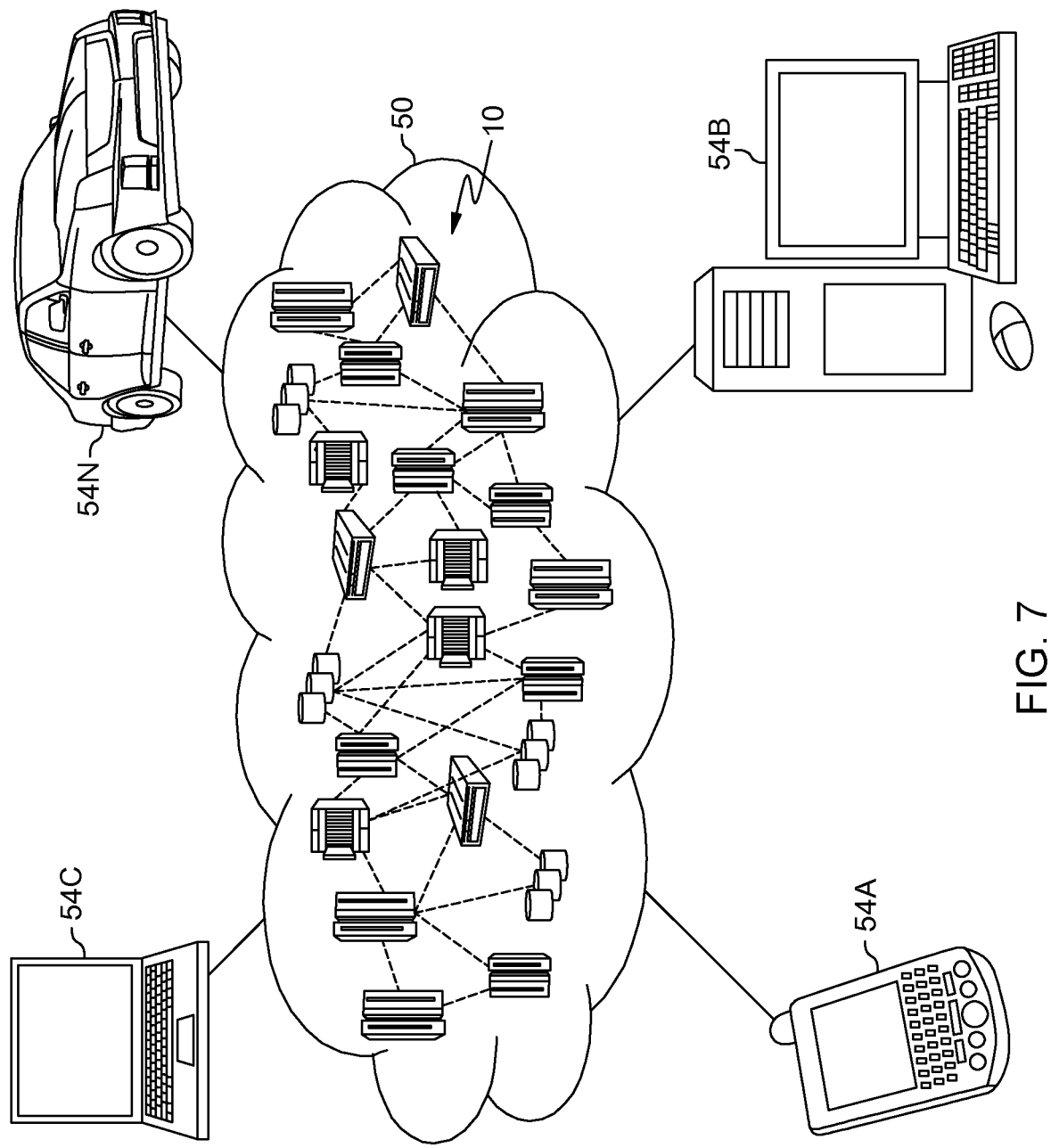
FIG. 7 depicts a cloud computing environment according to an embodiment of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
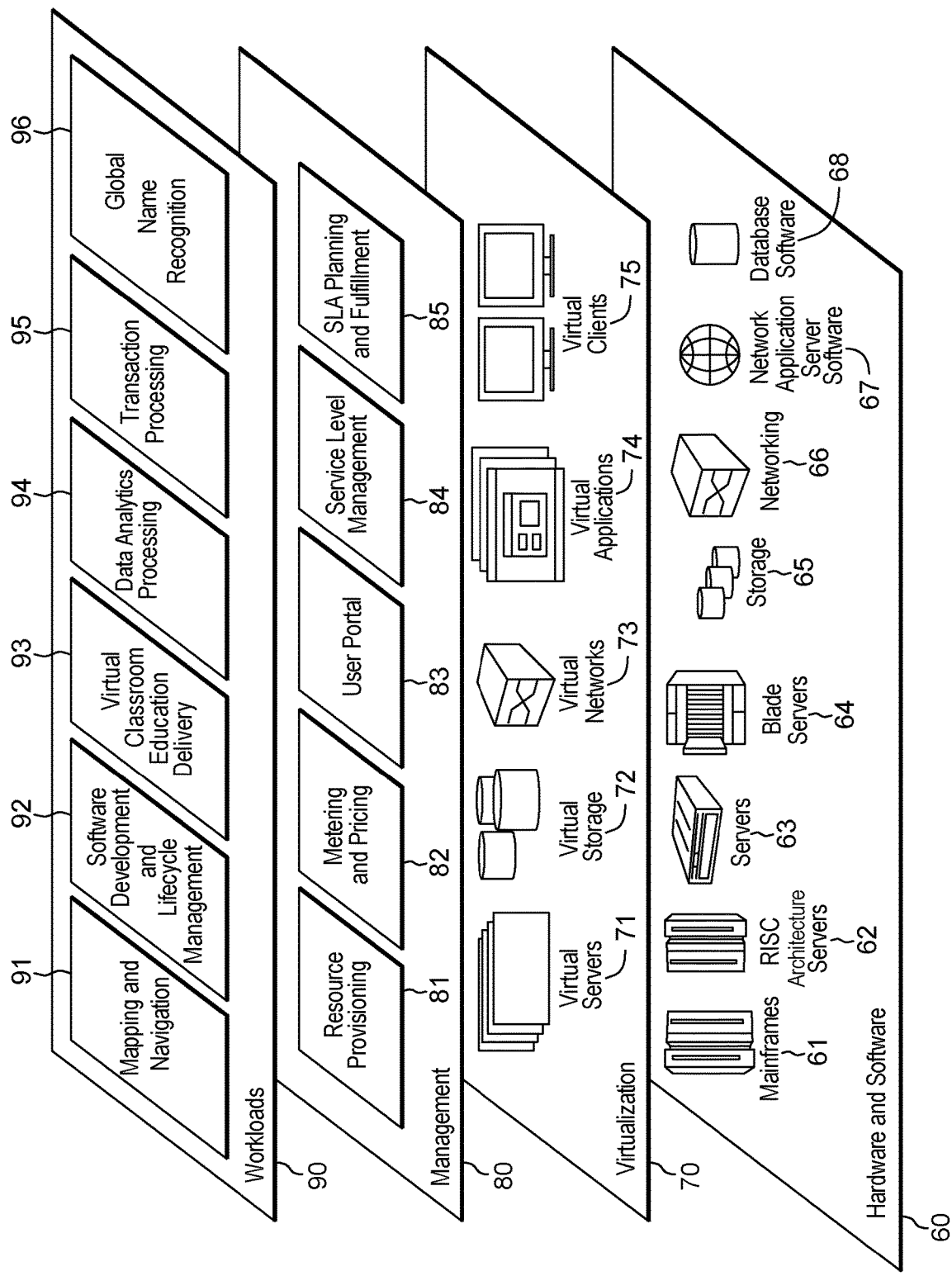
FIG. 8 depicts abstraction model layers according to an embodiment of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and global name recognition 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
receiving a queried name;
parsing the queried name into one or more name phrases;
building a name key for the queried name, the name key for identifying matches between the queried name and candidate names in a database, the building comprising:
calculating one or more name phrase digraph bitmap signatures for the queried name, the one or more name phrase digraph bitmap signatures comprising a name phrase digraph bitmap signature calculated for each name phrase of the one or more name phrases;
calculating at least one variant code for the queried name, the at least one variant code comprising a variant code calculated for each name phrase of a first group of at least one name phrase of the one or more name phrase of the queried name;
regularizing each name phrase of a second group of at least one name phrase of the one or more name phrases into a respective pseudo-phonetic version of the name phrase; and calculating at least one pseudo-phonetic name phrase digraph bitmap signature for the queried name, the at least one pseudo-phonetic name phrase digraph bitmap signature comprising a pseudo-phonetic name phrase digraph bitmap signature calculated for each regularized name phrase, of the second group of at least one name phrase, based on the pseudo-phonetic version of the name phrase;

wherein the name key comprises the one or more name phrase digraph bitmap signatures, the at least one variant code, and the at least one pseudo-phonetic name phrase digraph bitmap signature; and performing a name matching comparison between the queried name and the candidate names in the database, the name matching comparison comprising comparing the queried name to each candidate name of the candidate names in the database, in which the built name key for the queried name is compared to a name key for the candidate name.

2. The method of claim 1, wherein the parsing identifies at least (i) a surname, as one name phrase of the queried name, and (ii) a given name, as another name phrase of the queried name, and wherein the built name key for the queried name comprises:

surname elements, as those of the one or more name phrase digraph bitmap signatures, the at least one variant code, and the at least one pseudo-phonetic name phrase digraph bitmap signature calculated for the surname; and given name elements, as those of the one or more name phrase digraph bitmap signatures, the at least one variant code, and the at least one pseudo-phonetic name phrase digraph bitmap signature calculated for the given name.

3. The method of claim 2, wherein the comparison of a candidate name of the candidate names to the queried name comprises an initial determination that the surname of the queried name matches a surname of the candidate name based on comparing at least one of the surname elements of the built name key to at least one surname element of the name key for the candidate name, and then, based on the initial determination, proceeding to a determination of whether the given name of the queried name matches a given name of the candidate name based on comparing at least one of the given name elements of the built name key to at least one given name element of the name key for the candidate name.

4. The method of claim 1, wherein cultural provenance influences the parsing of the queried name into one or more name phrases, and further influences at least one selected from the group consisting of:

the calculating the at least one variant code for the queried name, wherein calculation of a variant code for a name phrase of the queried name is dependent on a cultural provenance of the queried name or the name phrase, in which different cultural provenances result in calculation of different variant codes for a common name phrase; and the regularizing each name phrase of the second group of at least one name phrase into the pseudo-phonetic version of the name phrase, wherein regularization of the name phrase is dependent on a cultural provenance of the queried name or the name phrase, in which different cultural provenances result in regularization into different pseudo-phonetic versions for a common name phrase and different resulting pseudo-phonetic name phrase digraph bitmap signatures for the common name phrase; and wherein the comparing the queried name to each candidate name of the candidate names in the database takes into account the cultural provenance of the queried name or the name phrase to select appropriate variant codes and pseudo-phonetic name phrase digraph bitmap signatures to use in the comparing the queried name to each candidate name of the candidate names.

5. The method of claim 1, further comprising building, for each candidate name of the candidate names, the name key for the candidate name, the building the name key for the candidate name comprising:

calculating one or more name phrase digraph bitmap signatures for the candidate name;

calculating at least one variant code for the candidate name;

regularizing one or more name phrases of the candidate name and calculating therefrom at least one pseudo-phonetic name phrase digraph bitmap signature for the candidate name; and storing the one or more name phrase digraph bitmap signatures for the candidate name, the at least one variant code for the candidate name, and the at least one pseudo-phonetic name phrase digraph bitmap signature for the candidate name together as part of the name key for the candidate name, to provide a stored name key for the candidate name, the stored name key being associated with the candidate name for retrieval of the stored name key when comparing the candidate name to other names.

6. The method of claim 1, wherein comparing the queried name to a candidate name of the candidate names in the database comprises triggering iterative comparison of each name phrase of the queried name to a respective corresponding name phrase of the candidate name to determine whether the name phrase of the queried name matches its corresponding name phrase of the candidate name, wherein, at each iteration of the iterative comparison, a selected name phrase of the queried name is compared to its corresponding name phrase of the candidate name to determine whether the name phrase of the queried name matches its corresponding name phrase of the candidate name, and wherein a match of each name phrase of the queried name to its corresponding name phrase of the candidate name indicates that the queried name and the candidate name match.

7. The method of claim 6, wherein the iterative comparison selects for comparison a name phrase identified as a surname of the queried name prior to selecting for comparison a name phrase identified as a given name of the queried name.

8. The method of claim 6, wherein comparing a name phrase of the queried name to its corresponding name phrase of the candidate name to determine whether the name phrase of the queried name matches its corresponding name phrase of the candidate name comprises:

comparing variant codes calculated for the name phrase of the queried name and its corresponding name phrase of the candidate name, and determining whether the compared variant codes match.

9. The method of claim 8, wherein the comparing the name phrase of the queried name to its corresponding name phrase of the candidate name further comprises performing one selected from the group consisting of:

based on determining that the compared variant codes match, determining that the name phrase of the queried name matches its corresponding name phrase of the candidate name, and proceeding to a next iteration of the iterative comparison; and based on determining that the compared variant codes do not match, triggering a name phrase digraph bitmap signature comparison between the name phrase of the queried name and its corresponding name phrase of the candidate name.

10. The method of claim 9, wherein the name phrase digraph bitmap signature comparison between the name phrase of the queried name and its corresponding name phrase of the candidate name comprises:

comparing name phrase digraph bitmap signatures calculated for the name phrase of the queried name and its corresponding name phrase of the candidate name, and determining whether the compared name phrase digraph bitmap signatures match.

11. The method of claim 10, wherein the name phrase digraph bitmap signature comparison between the name phrase of the queried name and its corresponding name phrase of the candidate name further comprises:

based on determining that the compared name phrase digraph bitmap signatures match, determining that the name phrase of the queried name matches its corresponding name phrase of the candidate name, and proceeding to a next iteration of the iterative comparison; and based on determining that the compared name phrase digraph bitmap signatures do not match, triggering a pseudo-phonetic name phrase digraph bitmap signature comparison between the name phrase of the queried name and its corresponding name phrase of the candidate name.

12. The method of claim 11, wherein the pseudo-phonetic name phrase digraph bitmap signature comparison between the name phrase of the queried name and its corresponding name phrase of the candidate name comprises:

comparing pseudo-phonetic digraph bitmap signatures for the name phrase of the queried name and its corresponding name phrase of the candidate name, and determining whether the compared pseudo-phonetic name phrase digraph bitmap signatures match.

13. The method of claim 12, wherein the pseudo-phonetic name phrase digraph bitmap signature comparison between the name phrase of the queried name and its corresponding name phrase of the candidate name further comprises:

based on determining that the compared pseudo-phonetic name phrase digraph bitmap signatures match, determining that the name phrase of the queried name matches its corresponding name phrase of the candidate name, and proceeding to a next iteration of the iterative comparison; and based on determining that the compared pseudo-phonetic name phrase digraph bitmap signatures do not match:

determining that the name phrase of the queried name does not match its corresponding name phrase of the candidate name;

based on determining that the name phrase of the queried name does not match its corresponding name phrase of the candidate name, determining that the queried name does not match the candidate name; and based on determining that the queried name does not match the candidate name, breaking from the iterative comparison and proceeding to a comparison of the queried name to a next candidate name of the candidate names in the database.

14. A computer system comprising:

a memory; and a processor in communication with the memory, wherein the computer system is configured to perform a method comprising:

receiving a queried name;

parsing the queried name into one or more name phrases;

building a name key for the queried name, the name key for identifying matches between the queried name and candidate names in a database, the building comprising:

calculating one or more name phrase digraph bitmap signatures for the queried name, the one or more name phrase digraph bitmap signatures comprising a name phrase digraph bitmap signature calculated for each name phrase of the one or more name phrases;

calculating at least one variant code for the queried name, the at least one variant code comprising a variant code calculated for each name phrase of a first group of at least one name phrase of the one or more name phrase of the queried name;

regularizing each name phrase of a second group of at least one name phrase of the one or more name phrases into a respective pseudo-phonetic version of the name phrase; and calculating at least one pseudo-phonetic name phrase digraph bitmap signature for the queried name, the at least one pseudo-phonetic name phrase digraph bitmap signature comprising a pseudo-phonetic name phrase digraph bitmap signature calculated for each regularized name phrase, of the second group of at least one name phrase, based on the pseudo-phonetic version of the name phrase;

wherein the name key comprises the one or more name phrase digraph bitmap signatures, the at least one variant code, and the at least one pseudo-phonetic name phrase digraph bitmap signature; and performing a name matching comparison between the queried name and the candidate names in the database, the name matching comparison comprising comparing the queried name to each candidate name of the candidate names in the database, in which the built name key for the queried name is compared to a name key for the candidate name.

15. The computer system of claim 14, wherein the parsing identifies at least (i) a surname, as one name phrase of the queried name, and (ii) a given name, as another name phrase of the queried name, and wherein the built name key for the queried name comprises:

(i) surname elements, as those of the one or more name phrase digraph bitmap signatures, the at least one variant code, and the at least one pseudo-phonetic name phrase digraph bitmap signature calculated for the surname; and (ii) given name elements, as those of the one or more name phrase digraph bitmap signatures, the at least one variant code, and the at least one pseudo-phonetic name phrase digraph bitmap signature calculated for the given name.

16. The computer system of claim 14, wherein cultural provenance influences the parsing of the queried name into one or more name phrases, and further influences at least one selected from the group consisting of:

the calculating the at least one variant code for the queried name, wherein calculation of a variant code for a name phrase of the queried name is dependent on a cultural provenance of the queried name or the name phrase, in which different cultural provenances result in calculation of different variant codes for a common name phrase; and the regularizing each name phrase of the second group of at least one name phrase into the pseudo-phonetic version of the name phrase, wherein regularization of the name phrase is dependent on a cultural provenance of the queried name or the name phrase, in which different cultural provenances result in regularization into different pseudo-phonetic versions for a common name phrase and different resulting pseudo-phonetic name phrase digraph bitmap signatures for the common name phrase; and wherein the comparing the queried name to each candidate name of the candidate names in the database takes into account the cultural provenance of the queried name or the name phrase to select appropriate variant codes and pseudo-phonetic name phrase digraph bitmap signatures to use in the comparing the queried name to each candidate name of the candidate names.

17. The computer system of claim 14, wherein comparing the queried name to a candidate name of the candidate names in the database comprises triggering iterative comparison of each name phrase of the queried name to a respective corresponding name phrase of the candidate name to determine whether the name phrase of the queried name matches its corresponding name phrase of the candidate name, wherein, at each iteration of the iterative comparison, a selected name phrase of the queried name is compared to its corresponding name phrase of the candidate name to determine whether the name phrase of the queried name matches its corresponding name phrase of the candidate name, and wherein a match of each name phrase of the queried name to its corresponding name phrase of the candidate name indicates that the queried name and the candidate name match, wherein comparing a name phrase of the queried name to its corresponding name phrase of the candidate name to determine whether the name phrase of the queried name matches its corresponding name phrase of the candidate name comprises:

comparing variant codes calculated for the name phrase of the queried name and its corresponding name phrase of the candidate name, and determining whether the compared variant codes match;

based on determining that the compared variant codes do not match, triggering a name phrase digraph bitmap signature comparison between the name phrase of the queried name and its corresponding name phrase of the candidate name, wherein the name phrase digraph bitmap signature comparison between the name phrase of the queried name and its corresponding name phrase of the candidate name comprises, comparing name phrase digraph bitmap signatures calculated for the name phrase of the queried name and its corresponding name phrase of the candidate name, and determining whether the compared name phrase digraph bitmap signatures match;

based on determining that the compared name phrase digraph bitmap signatures do not match, triggering a pseudo-phonetic name phrase digraph bitmap signature comparison between the name phrase of the queried name and its corresponding name phrase of the candidate name, wherein the pseudo-phonetic name phrase digraph bitmap signature comparison between the name phrase of the queried name and its corresponding name phrase of the candidate name comprises comparing pseudo-phonetic digraph bitmap signatures for the name phrase of the queried name and its corresponding name phrase of the candidate name, and determining whether the compared pseudo-phonetic name phrase digraph bitmap signatures match; and based on determining that the compared pseudo-phonetic name phrase digraph bitmap signatures do not match:
determining that the name phrase of the queried name does not match its corresponding name phrase of the candidate name;
based on determining that the name phrase of the queried name does not match its corresponding name phrase of the candidate name, determining that the queried name does not match the candidate name; and
based on determining that the queried name does not match the candidate name, breaking from the iterative comparison and proceeding to a comparison of the queried name to a next candidate name of the candidate names in the database.

18. A computer program product comprising:
a computer readable storage medium readable by a processing circuit and storing instructions for execution by the processing circuit for performing a method comprising:
receiving a queried name;
parsing the queried name into one or more name phrases;
building a name key for the queried name, the name key for identifying matches between the queried name and candidate names in a database, the building comprising:
calculating one or more name phrase digraph bitmap signatures for the queried name, the one or more name phrase digraph bitmap signatures comprising a name phrase digraph bitmap signature calculated for each name phrase of the one or more name phrases;
calculating at least one variant code for the queried name, the at least one variant code comprising a variant code calculated for each name phrase of a first group of at least one name phrase of the one or more name phrase of the queried name;
regularizing each name phrase of a second group of at least one name phrase of the one or more name phrases into a respective pseudo-phonetic version of the name phrase; and
calculating at least one pseudo-phonetic name phrase digraph bitmap signature for the queried name, the at least one pseudo-phonetic name phrase digraph bitmap signature comprising a pseudo-phonetic name phrase digraph bitmap signature calculated for each regularized name phrase, of the second group of at least one name phrase, based on the pseudo-phonetic version of the name phrase;
wherein the name key comprises the one or more name phrase digraph bitmap signatures, the at least one variant code, and the at least one pseudo-phonetic name phrase digraph bitmap signature; and
performing a name matching comparison between the queried name and the candidate names in the database, the name matching comparison comprising comparing the queried name to each candidate name of the candidate names in the database, in which the built name key for the queried name is compared to a name key for the candidate name.

19. The computer program product of claim 18, wherein the parsing identifies at least (i) a surname, as one name phrase of the queried name, and (ii) a given name, as another name phrase of the queried name, and wherein the built name key for the queried name comprises:
   (i) surname elements, as those of the one or more name phrase digraph bitmap signatures, the at least one variant code, and the at least one pseudo-phonetic name phrase digraph bitmap signature calculated for the surname; and
   (ii) given name elements, as those of the one or more name phrase digraph bitmap signatures, the at least one variant code, and the at least one pseudo-phonetic name phrase digraph bitmap signature calculated for the given name.

20. The computer program product of claim 18, wherein comparing the queried name to a candidate name of the candidate names in the database comprises triggering iterative comparison of each name phrase of the queried name to a respective corresponding name phrase of the candidate name to determine whether the name phrase of the queried name matches its corresponding name phrase of the candidate name, wherein, at each iteration of the iterative comparison, a selected name phrase of the queried name is compared to its corresponding name phrase of the candidate name to determine whether the name phrase of the queried name matches its corresponding name phrase of the candidate name, and wherein a match of each name phrase of the queried name to its corresponding name phrase of the candidate name indicates that the queried name and the candidate name match, wherein comparing a name phrase of the queried name to its corresponding name phrase of the candidate name to determine whether the name phrase of the queried name matches its corresponding name phrase of the candidate name comprises:
   comparing variant codes calculated for the name phrase of the queried name and its corresponding name phrase of the candidate name, and determining whether the compared variant codes match;
   based on determining that the compared variant codes do not match, triggering a name phrase digraph bitmap signature comparison between the name phrase of the queried name and its corresponding name phrase of the candidate name, wherein the name phrase digraph bitmap signature comparison between the name phrase of the queried name and its corresponding name phrase of the candidate name comprises, comparing name phrase digraph bitmap signatures calculated for the name phrase of the queried name and its corresponding name phrase of the candidate name, and determining whether the compared name phrase digraph bitmap signatures match;
   based on determining that the compared name phrase digraph bitmap signatures do not match, triggering a pseudo-phonetic name phrase digraph bitmap signature comparison between the name phrase of the queried name and its corresponding name phrase of the candidate name, wherein the pseudo-phonetic name phrase digraph bitmap signature comparison between the name phrase of the queried name and its corresponding name phrase of the candidate name comprises comparing pseudo-phonetic digraph bitmap signatures for the name phrase of the queried name and its corresponding name phrase of the candidate name, and determining whether the compared pseudo-phonetic name phrase digraph bitmap signatures match; and
   based on determining that the compared pseudo-phonetic name phrase digraph bitmap signatures do not match:
      determining that the name phrase of the queried name does not match its corresponding name phrase of the candidate name;
      based on determining that the name phrase of the queried name does not match its corresponding name phrase of the candidate name, determining that the queried name does not match the candidate name; and
      based on determining that the queried name does not match the candidate name, breaking from the iterative comparison and proceeding to a comparison of the queried name to a next candidate name of the candidate names in the database.

* * * * *